(12) United States Patent
Stuth

(10) Patent No.: US 9,440,417 B2
(45) Date of Patent: Sep. 13, 2016

(54) METHOD OF MAKING A METAL-STRIP LAMINATE

(71) Applicant: Bernhard Stuth, Mannheim (DE)

(72) Inventor: Bernhard Stuth, Mannheim (DE)

(*) Notice: Subject to any disclaimer, the term of this patent is extended or adjusted under 35 U.S.C. 154(b) by 329 days.

(21) Appl. No.: 13/887,446

(22) Filed: May 6, 2013

(65) Prior Publication Data

US 2013/0295443 A1    Nov. 7, 2013

(30) Foreign Application Priority Data

May 7, 2012 (DE) .......................... 10 2012 008 816

(51) Int. Cl.
| | | |
|---|---|---|
| B32B 15/01 | (2006.01) |
| B23K 20/04 | (2006.01) |
| C22C 38/00 | (2006.01) |
| C22C 38/04 | (2006.01) |
| C22C 38/06 | (2006.01) |
| C22F 1/00 | (2006.01) |
| C22F 1/10 | (2006.01) |
| C25D 7/06 | (2006.01) |
| H01M 2/02 | (2006.01) |

(52) U.S. Cl.
CPC .............. B32B 15/01 (2013.01); B23K 20/04 (2013.01); B32B 15/015 (2013.01); C22C 38/004 (2013.01); C22C 38/04 (2013.01); C22C 38/06 (2013.01); C22F 1/00 (2013.01); C22F 1/10 (2013.01); C25D 7/0614 (2013.01); H01M 2/026 (2013.01); H01M 2/0285 (2013.01); H01M 2/0287 (2013.01); B23K 2203/18 (2013.01); H01M 2/023 (2013.01); Y10T 428/12493 (2015.01)

(58) Field of Classification Search
CPC ........... H01M 2/0285; H01M 2/0287; H01M 2/026; B32B 15/01; B32B 15/015; B23K 20/04
USPC .................. 429/176; 228/116, 117; 148/527; 428/615
See application file for complete search history.

(56) References Cited

U.S. PATENT DOCUMENTS

| | | | |
|---|---|---|---|
| 2003/0175550 A1 | 9/2003 | Rumbach et al. | |
| 2004/0069838 A1* | 4/2004 | Sibum ............... | B32B 15/017 228/235.2 |
| 2008/0251389 A1* | 10/2008 | Kingston ............ | C25D 5/10 205/191 |

FOREIGN PATENT DOCUMENTS

| | | |
|---|---|---|
| CN | 1114598 A | 7/1994 |
| CN | 1739913 A | 3/2006 |
| CN | 101574861 A | 6/2009 |
| CN | 101877420 A | 11/2010 |
| CN | 202094238 U | 12/2011 |
| EP | 0945209 A1 | 9/1999 |

* cited by examiner

*Primary Examiner* — Karie O'Neill Apicella
(74) *Attorney, Agent, or Firm* — Andrew Wilford

(57) ABSTRACT

A metal laminate is made by first laying at least one first metal strip of at least one first metal having a thickness of 40 μm to 750 μm on at least one second metal strip of a second metal different from the first metal to form a multilayer stack having a total thickness between 2 mm and 15 mm. Then the first and second strips of the multilayer stack are bonded together by rolling. Finally a finished laminate is formed by reducing a thickness of the bonded-together first and second strips by rolling in at least one pass such that the one first metal strip has a thickness of 0.5 to 10 μm.

14 Claims, 1 Drawing Sheet

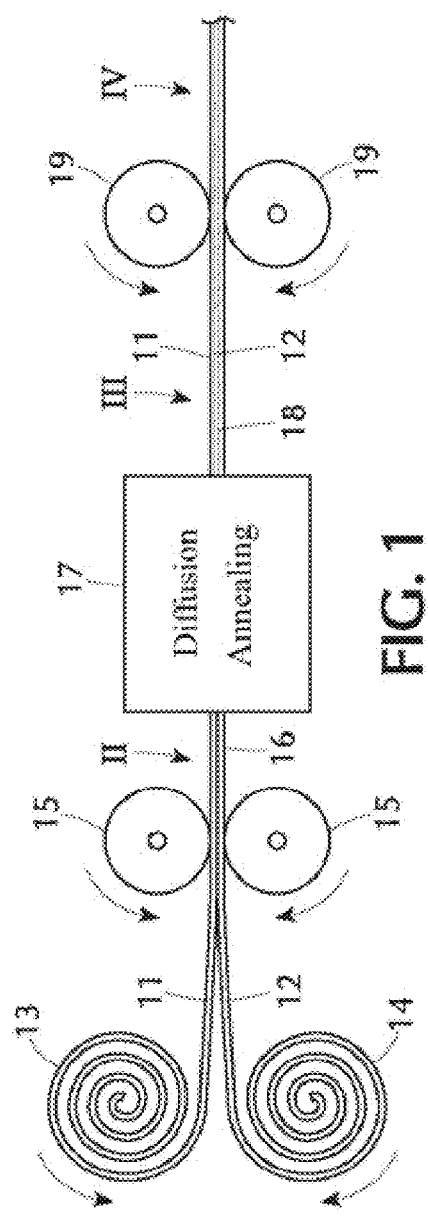
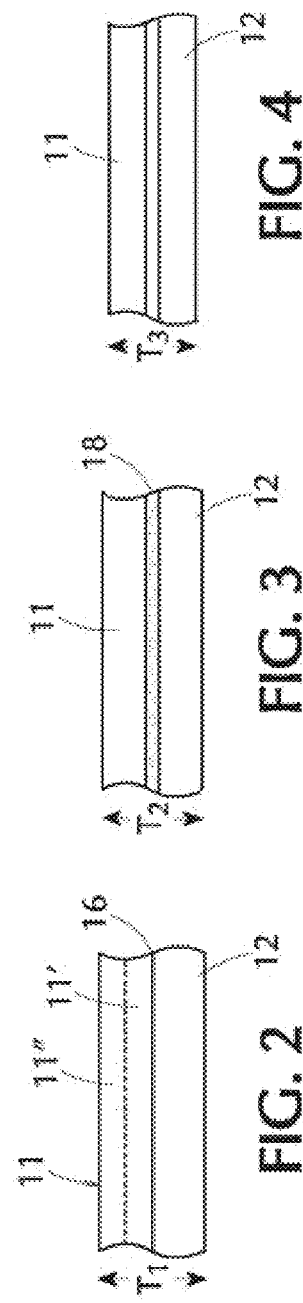

METHOD OF MAKING A METAL-STRIP LAMINATE

FIELD OF THE INVENTION

The present invention relates to the manufacture of a laminate. More particularly this invention concerns a method of making a metal-strip laminate having at least one metallic layer of a thickness equal to or less than 10 µm, forming either an outer face or an inner layer of the laminate.

BACKGROUND OF THE INVENTION

Metallic layers, particularly so-called thin metallic layers on metallic bodies, are made by a number of different chemical and physical methods. So-called thin layers are layers in the nanometer or micrometer range. Thin layers within the meaning of the invention are preferably such layer thicknesses that are smaller than 10 µm, preferably in the range of 0.5 to 10 µm. Depending on the composition of the surface configuration, such layers have, for example, esthetic or technical functions; for example, they can serve as a shield that protects the core material.

The manufacture of thin metallic layers on comparatively thick metallic strips (with a layer thickness ratio of 1:10 and greater) is basically known in the art. Whenever thin metallic surface layers are applied to substrate strips, the prior art provides, however, for them to be generated individually and already present as thin layers, particularly such that they already have the desired end thickness when the layer is made.

Known methods for generating thin metallic surface layers are, for example,
  a) galvanizing
  b) currentless (chemical) coating
  c) hot-dip coating
  d) CVD/PVD.

These methods differ in the thickness of the layers that can be generated, as well as in the structure and the properties of the finished layers.

Disadvantageously, these coating methods require that the coating be applied to substrates that are already close to having their final dimensions. This why correspondingly large surface areas must be made, cleaned, activated and coated. Coating methods of this kind are therefore complex and expensive.

Furthermore, layers made by thin-film coating methods, particularly galvanization, are not free of pores. Thinly coated metal strips, particularly when coated by galvanization, must therefore be post-rolled in an additional work step. Along the walls of the pores, it is easier for the core materials, meaning the material of the metal strip that carries the coating, to diffuse through the top layer. To obtain a closed layer, minimum thicknesses are necessary, depending on the deposited material. For a galvanic coating with nickel, this minimum thickness is about 3 µm.

The metal strip that is intended for a coating process has a continuous oxide layer if the oxides are not removed or reduced, or if the coating procedure is not done under a protective gas atmosphere or in a vacuum. The oxide layer creates a contact resistance between this metal strip that is to be coated and the layer to be applied. If the coated metal strip is used for conducting current, this contact resistance must be overcome.

The layers that are made by thin-layer coating methods, particularly by galvanization, lack sufficient adhesive strength to withstand any major following deformation. Thinly coated, particularly galvanically coated, metal strips must therefore undergo diffusion annealing to reinforce the bond. This is especially unavoidable if the laminate must be deformed afterward, for example in a deep-drawing step. During annealing, the oxide layer as such remains intact; however, undesired mixed crystals typically form inside a diffusion layer that is generated between the metal strip that is to be coated and the applied layer. Such a mixed-crystal layer that is formed by diffusion annealing consumes material of the deposited layer and thereby reduces the protective function thereof.

OBJECTS OF THE INVENTION

It is therefore an object of the present invention to provide an improved method of making a metal-strip laminate.

Another object is the provision of such an improved method of making a metal-strip laminate that overcomes the above-given disadvantages, in particular so-called thin metallic layers, on the top and/or bottom side(s) of metal strips and/or within metal strips wherein:

fewer surface oxides and further metallic inclusions are embedded in the laminate throughout the course of the coating process;

the thickness of mixed-crystal zones that are generated by the thermal treatment can be limited; and economic advantages in comparison to existing thin-layer coating methods are obtained.

SUMMARY OF THE INVENTION

A metal laminate is made by first laying at least one first metal strip of at least one first metal having a thickness of 40 µm to 750 µm on at least one second metal strip of a second metal different from the first metal to form a multilayer stack having a total thickness between 2 mm and 15 mm. Then the first and second strips of the multilayer stack are bonded together by rolling. Finally a finished laminate is formed by reducing a thickness of the bonded-together first and second strips by rolling in at least one pass such that the one first metal strip has a thickness of 0.5 to 10 µm.

An essential aspect of the invention envisions that a laminate is created first in which each layer eventually having a thickness of <10 µm starts as a relatively thick layer (>10 µm) with at least one second metal strip that is at least 10 times, preferably more than 100 times, thicker than the first metal strip in the finished laminate.

The invention results in the substitution of commonly used thin-layer coating methods to date by a coating method, particularly a thick-layer coating method with at least a two-time thickness reduction of the at least one layer, particularly the layer that is the "thick" layer, in comparison to the methods to date by roll bonding and rolling. Due to the manufacture method, and in contrast to coating methods to date with a subsequent diffusion annealing step, it is possible to set a thinner mixed-crystal layer.

BRIEF DESCRIPTION OF THE DRAWING

The above and other objects, features, and advantages will become more readily apparent from the following description, reference being made to the accompanying drawing in which:

FIG. 1 is a largely schematic view of the method of this invention; and

FIGS. 2-4 are detail views showing the workpiece at the locations indicated a II, III, and IV in FIG. 1.

DETAILED DESCRIPTION OF THE INVENTION

As seen in FIGS. 1-4 a metal-strip laminate is created, for example, by combining a plurality of metal strips 11 and 12 that have been unwound from respective coils 13 and 14, particularly under the active effect of a brake exerting a retracting or decelerating force. At least the strip 11 constitutes the at least one previously mentioned first metal strip, and the metal strip 12 constitutes the previously referred to second metal strip.

The initially still loose multilayer stack having a thickness $T_1$ is bonded together at 16 between rolls 15 so that its thickness, which is equal to the sum of the thicknesses of the two strips 11 and 12, is reduced to a thickness $T_2$ for the first time, for example, only by a measure that is necessary to bond them together, for example, 60%. The result is the starting laminate shown in FIG. 2 that is already reduced tp a thickness $T_2$ relative to the thickness $T_1$ of the original unbonded multilayer stack and that is now further reduced by rolling in one pass or, if necessary, in a plurality of passes between rolls 19 to a thickness $T_3$. A thickness reduction according to the invention is thereby achieved twice, such that at least one first metal strip has a thickness equal to or smaller than 10 μm, particularly a thickness of 0.5 μm to 10 μm, in the laminate finished according to the invention. It is preferred that the thickness-reduction rolling step at the roll 19, which follows the roll-bonding step at the rolls 15, yields an amount of thickness reduction of at least 50% in one pass, more preferred of at least 75% and especially preferred of at least 85%.

According to the invention, the term multilayer stack therefore means the strips 11 and 12 that are supplied unconnected before roll bonding with a thickness $T_1$; and the term stack denotes these strips after they have been connected in the roll-bonding step and have a thickness $T_2$. The total thickness of all metal strips of the multilayer stack is understood to mean the thickness $T_1$ of the multilayer stack before roll bonding. The first metal strip 11 constitutes the material that is connected as one layer with the second metal strip 12 such as, for example, a core strip.

Necessarily associated with the thickness reduction of the thickness is an increase in surface area of the reduced laminate. For example, if a metal-strip laminate having a strength of 6 mm, is reduced by 96%, the surface area is increased 25-fold.

Regarding the enlargement of the surface areas of layers that are reduced by roll bonding and subsequent thickness-reduction rolling, the amounts of thickness reduction of the individual stages follow this multiplication schedule: if thickness $T_1$ of the original multilayer stack is reduced by roll bonding to 0.4 $T_1$, meaning an amount of thickness reduction r of 0.6 (~60%) is used, the surface area of the generated laminate already increases 2.5-times [1/(1−0.6)]. Each further thickness reduction results in a multiplication of the effect with the inverse value of 1—amount of thickness reduction. In a further thickness reduction by 90%, the total amount of thickness reduction is 96% and the total increase of the surface area is therefore 25-times the value of the starting surface area, producing the thickness $T_3$.

Systematic advantage is taken of this effect in the manufacture of laminates with "thin" layers according to the invention. This is achieved in that the thicknesses of the at least one second metal strip are selected as high as possible;

the expensive coating process is conducted on surface areas that are as small as possible, because coating large surface areas is relatively expensive. Coating must be achieved by roll bonding, as roll bonding is the only method that already generates a thickness reduction, in fact a major thickness reduction, of the coating, such that a first increase of the surface area already occurs at this time;

the at least one second metal strip and the at least one first metal strip, which constitutes the desired layer, are reduced together, such that the thickness reduction of a layer does not have to be handled separately and at a high cost;

the thickness reduction by roll bonding and rolling is instrumental in a corresponding increase of the surface area, so that thickness reduction is typically achieved, first and foremost, by an especially productive method, namely strip rolling. In terms of process economy, it is significant to note that especially the rolling step after the roll bonding step can be done at high speeds (for example, using a four-high or six-high rolling stand) and/or amounts of reduction (for example, using a Sendzimir rolling mill).

It is the combination of these effects that produces the efficiency and thereby the economic benefit of the proposed method. Although roll bonding is a more expensive process per unit surface area of coating than those cheaper processes in the generation of thinner layers, it is, in fact, the combination with the reducing step by rollers that renders it economically more advantageous, provided the thickness reduction factor, and thereby the increase of the coating surface area caused by the thickness reduction, is large enough.

The processing speeds for the methods as mentioned above are as follows:

| Method | Speed m/min |
|---|---|
| Roll bonding | 10-30 |
| Galvanizing | 120-200 |
| Rolling | to 1,000 |

A thickness reduction factor that makes the method according to the invention more economical will typically call for an intermediate annealing step such as shown at 17 in FIG. 1, which can be correspondingly envisioned according to the invention, for example, as a diffusion annealing step already after the roll bonding step of making an increased adhesion 18 (FIG. 3) of the layers 11 and 12 in the laminate, or also as a recrystallizing annealing step after the rolling step. The material combinations are thus not limited to those only that do not form (brittle) mixed-crystal layers during the intermediate annealing step. The generation of mixed-crystal layers can be allowed with the proposed method, because they are reduced in thickness by rolling after annealing, and/or because they can be formed as very thin by utilizing continuous annealing.

Assuming that, with galvanic coating as well as with the method according to the invention, the second metal strip 12 that must be provided with at least one layer, for example a core metal strip surrounded by layers, is reduced from approximately 6 mm to 0.24 mm, from a standpoint of economy, only the galvanization costs must be compared to the costs of the manufacture of the first metal strip 11, for example a roll bonding film, and the costs of thickness reduction by roll bonding with the costs of thickness reduction by rolling, because the other method steps are the same. Only if in the following Example 1, the costs of producing the roll bonding film and the extra costs of thickness reduction by roll bonding exceed, relative to the thickness reduction by rolling, the galvanization costs by a factor of 25, does the method according to the invention no longer make economic sense.

A surface area enlargement factor of 25 is more likely at the lower end of the achievable increase of the surface area, as it is recommended that an original multilayer stack be formed that is as thick as possible. In consequence, provided the amount of thickness reduction used during roll bonding is held constant, to achieve an equally thick laminate that is made according to the invention, the amount of thickness reduction that is be used after the roll bonding and during the rolling step must increase. Correspondingly, the enlargement of the surface area increases over-proportionately according to the data of Example 2—being more in line with the intentions of the invention—by a factor of almost 42. In a preferred improvement, an overall thickness reduction is thus sought that will result at least in an increase of the surface area by a factor of 25 of the generated laminate in contrast to the original multilayer stack.

| Work step | | Example 1 Basic material | | Example 2 Basic material | |
| --- | --- | --- | --- | --- | --- |
| | | % | mm | % | mm |
| | Starting material | | 6.0 | | 10 |
| Roll bonding | Thickness reduction by | 60 | 2.4 | 60 | 4.0 |
| Rolling | Thickness reduction by | 90 | 0.24 | 94 | 0.24 |
| | Total amount of reduction | 96 | | 97.6 | |
| | | Multiplier | | Multiplier | |
| Surface area increase | | 25 | | 41.67 | |

If a diffusion annealing step is implemented during a thin-film coating process to achieve improved adhesion, this step occurs on a thin strip with a thin coating. The percentage of the forming mixed-crystal layer relative to the total thickness of the strip is therefore higher than in the improvement of the method according to the invention as described below.

The core of a proposed improvement of the method provides for moving the diffusion annealing step that becomes necessary in the course of the manufacture to an earlier point, specifically such that at least one reducing pass is implemented thereafter, particularly such that the diffusion annealing is carried out on comparatively thick strips with a thick coating. Due to the fact that a mixed-crystal layer and/or diffusion layer 16 assumes an absolute thickness essentially for technical reasons, this thickness is small if seen in a relative context based on the strength of the laminate before the one or more subsequent further thickness-reduction passes, and it is reduced together with the former in this pass. The share of this mixed-crystal layer in the total thickness of the generated metal-strip laminate is therefore lower in terms of a percentage and remains approximately constant during any further deformation of the strip. Any further annealing treatments that become necessary are not implemented as diffusion annealing but as recrystallization annealing, preferably continuous annealing, such that the time period of a thermal treatment is too short for new extended mixed-crystal zones to be able to form.

During the thickness-reduction step between rollers 19 of the formed laminate, the following problems must be resolved:

Roll bonding calls for working at high pressures; therefore, stronger roller warping must be expected than with cold rolling that is carried out at lower pressures. The bonded together strips 11 and 12 thus have a convex cross-section.

The literature on roll bonding generally assumes that the top layer and core material are proportionately reduced during roll bonding and further rolling action. However, with thin metallic coatings, it is necessary to consider that with decreasing thickness the material hardens. The Boudinage effect applies for thin layers between thick softer layers; meaning, with considerable deformation, such layers will tear and become embedded in the softer material. The composite must be annealed before the Boudinage effect can occur.

Hot-rolled strips according to DIN EN 10 051 have limited roughness values. These roughness values are close to the total layer thickness of the thin-layer coating. When the peaks become impressed in the metallic coating, the coating can be perforated during the rolling step. Furthermore, the surface of the core and/or metallic coating strip(s) is (are) activated before the roll bonding by wire brushing or radiation. This way, it is possible to further roughen the surface. The roughness values of the material that is to be connected must be limited, if necessary.

In a number of metal combinations, the strip will have to be subjected to recrystallizing annealing, possibly multiple times, after the manufacture of a laminate by roll bonding and prior to final use. Each intermediate annealing action creates an often brittle mixed crystal layer. Due to the multiple annealing processes, it is possible for the mixed crystal layer to be thicker than the layer that is created by diffusion annealing following a galvanic coating step. This would be undesired.

DETAILED DESCRIPTION OF THE INVENTION

1. Use of Hot-Melted Metallurgically Made Strips

If hot-melted metallurgically made strip is used as the first metal strip, the strip must be made without inclusions, as much as this is possible. This requires special care during casting, possibly remelting, for example by the ESR process. The high costs that are incurred as a consequence can preclude the use of hot-melted metallurgically made strips of plain metals for economic considerations.

2. Use of Strips Obtained Directly or Indirectly by Electrolysis

The layers that must be applied or embedded, meaning the first metal strips, are made especially advantageously from material that is electrolytically obtained in a strips. In terms of electrolytic manufacture, strips are made primarily of copper (for PCB's) and nickel in that metal ions are deposited on a rotating drum hanging inside an electrolysis bath from which the metallic precipitation can be drawn off as a strip. Strips made of connected electrolytically obtained cathode plates and reduced by rolling, can be made of iron, cobalt, nickel, copper, zinc, cadmium, tin and lead. Although chromium and manganese are also made as cathode plates, they break when separated from the permanent cathodes.

Electrolytically made strips—irrespective of the method—can be made without inclusions and at a high level of purity. This is important because particles that are initially locked in the laminate become concentrated on the surface when the layer is reduced in thickness, specifically the thinner the layer becomes. The use of electrolytically made strips, therefore, makes economic sense and is technically advantageous.

3. Multilayer Coatings, Particularly Thin Coatings and Thin Exterior Coatings

Laminates of a plurality of layers according to the invention can be made by feeding the metal strip from a plurality of supply coils into the roll gap as indicated at 11' and 11" in FIG. 2. In the alternative, the supplied strips themselves can have been made by roll bonding, for example, according to the presently described method according to the invention. Pre-roll bonding of this kind is necessary when the coating thickness is so thin in the final product that the thickness of the starting material must be less than about 40 μm even before roll bonding. If a strip of 40 μm thickness is reduced 60% by roll bonding and 97% by subsequent rolling, the layer that results from the multilayer materials only has a thickness of 0.48 μm. If thinner layers must be made, the amount of thickness reduction must be increased by roll bonding or rolling, or it is necessary to use material that was already roll bonded.

Oils and emulsions are used as lubricants during rolling. If these lubricants are purified, for example, by centrifuging, it can be seen that metallic abrasion occurs during the rolling step. This abrasion is always at the expense of the surface layers. The extent of the abrasion depends on the roughness or hardness of the material surface, the roughness of the rollers, the lubricating effect of the used lubricant, and further factors. This aspect is significant for the coating method according to the invention because it has an impact on the calculation of the thickness of the material of the starting layer. The thickness of the materials of the starting layer, particularly therefore external first metal strips, must be increased by the amount of abrasion occurring during the different rolling stages.

If the external material is especially valuable, it can make sense to protect the later external layer by a shield-type layer against abrasion during the roll bonding and later rolling step, which is a layer that is intended to be worn away and can also be applied by roll bonding.

4. Requirements of the Core Materials

Surface roughness of the layer and/or core material(s) following lamination results in the thickness of the layer and core material (meaning the first metal strip and second metal strip) not being maintained continuously. The surface roughness of the layer and core materials must therefore be limited as much as possible. This can be achieved, for example, by the selection of the method that is to be used for pickling the used hot-rolled strip. Correspondingly, pickling with sulfuric acid results in higher roughness than pickling with hydrochloric acid. The roughness of the pickled hot-rolled strip or of other pre-materials can be reduced further by a skin pass, particularly a skin pass with polished rollers.

Moreover, it has been shown that, due to stretching of the material, rolling reduces the roughness values in the composite.

5. Starting Dimensions of the Used Strips

Starting and end dimensions should be in these ranges:

|  | Thickness | From | To |
|---|---|---|---|
| Layer | Before reducing | 40 μm | 750 μm |
|  | After reducing | 0.5 μm | 10 μm |
| Core | Before reducing | 2 mm | 15 mm |
|  | After reducing | 0.05 mm | 3.0 mm |

The strip-type laminates according to the invention should be made, for example, from comparatively thick core material, for example, between 2 and 15 mm, that is coated with a comparatively thick starting metal layer in form of a strip between 40 and 750 μm by roll bonding. The goal is to achieve, by roll bonding and subsequent further thickness reduction, final dimensions of at least 0.0505 to at most 3.01 mm. The total amount of thickness reduction is preferably at least 75%. The metal strips then have a coating strength of 0.5 to 10 μm.

6. Roll Bonding

The roll bonding technique, strip preparation and application of material-dependent amounts of deformation, which are required for the green adhesion of the layers to be connected, are known in the art. For nickel and steel roll bonding on steel at room temperature, a deformation of, for example, 60% is sufficient.

a) Increase of the Surface Area by Thickness Reduction

Roll bonding is the only coating method where the coating itself results in a thickness reduction and related enlargement of the surface area.

b) Continuous Oxide Layers

If oxides adhering to the surfaces of the metal strips that are to be connected are not abraded or reduced, they become part of the laminate. Oxides are hard and resist deformation. Therefore, strips that are to be connected should have an oxide layer that is as thin as possible. To this end, it is envisioned that at least the one first metal strip that constitutes a layer and/or the at least one metal strip constituting, for example, a core, are stripped of oxide shortly before the roll bonding, using mechanical (for examples, radiation or brushing) or chemical (for example, pickling or annealing) methods. By containing the strip in an inert gas atmosphere to shortly before the roll gap, it is possible to avoid reoxidation for the most part.

If a thin oxide layer has formed on the metals that are to be connected, the layer is ripped open during roll bonding such that metallically bare surfaces are connected as well. Thus, roll bonding destroys a closed oxide layer.

c) Freedom from Pores

Due to the high amount of material compression, roll bonding creates layers that are free of pores.

d) Roller Warping

To avoid the roll-bonded laminate from taking on a convex cross-section, the use of support rollers with almost square or even oversquare cross-sections is possible; other methods that help avoid or compensate for roller warping are possible as well. Although a convex strip shape, if once formed, can be corrected during subsequent rolling of the metal-strip laminate, this correction, however, can also affect the layer thickness, such that the layer thickness is no longer constant over the cross-section of the strip.

7. Recrystallizing Annealing a) Reasons

Due to the thickness reduction, the hardness of the second metal strip (for example, the core material) as well as of first metal strips forming the layers increases because of the cold-working. The increase must be removed again, if necessary, by an annealing process. After roll bonding, the composite is typically annealed, which also strengthens the adhesion between strips.

b) Development of Mixed-Crystal Layers, Particularly of Brittle Mixed Crystal Layers Mixed-crystal layers develop during the annealing process; and they are often—depending on the connected materials—not only harder but also more brittle than the adjacent material. These mixed-crystal layers render any further deformation more difficult. With the proposed method, these layers only play a minimal role. The thickness of these layers is reduced by the subsequent rolling step; it can be even further limited in that continuous annealing is applied after the rolling step for the purpose of a recrystallizing annealing. With continuous annealing, it is possible to achieve a recrystallization in a shorter time than in a bell-type annealing furnace such that, in addition, only thinner mixed-crystal layers form. In the metal-strip laminate that is made by rolling according to the invention, contrary to thin-coated strip, no diffusion annealing is necessary.

If annealing is carried out after the roll bonding step, there results a mixed-crystal layer that has, for example, in a laminate comprised of nickel/steel a thickness of about 1.4 µm. This mixed-crystal layer is also reduced during the subsequent thickness reduction step, particularly by about 50% to 97%. This is why the remaining thin mixed-crystal layer does not have a major influence on the material properties.

8. Reducing by Rolling

If the metal strips of the formed multilayer stacks are connected to each other at an amount of deformation of 60%, and if the thus formed laminate is then reduced by 50%, the total amount of thickness reduction is 80%. The laminate then only has 20% of the starting strength: $(1-0.6)*(1-0.5)=0.2$. Within the laminate, the individual layers have been evenly reduced. Only films having a thickness of at least about 40 µm can be roll-bonded; after roll bonding, the layer then has a thickness of only 16 µm. However, it is the object of the method to produce thinner layers. Therefore, the roll-bonded composite must be further reduced by rolling, specifically, preferably by at least another 50%.

a) No Mixing of Layers when Rolling Thin Layers

Rolling studies have shown that even with a strong thickness reduction and the associated increase of the surface area that causes, the material of the surface area does not mix with the material from the strip core. The known forward slip of the surface before the core of the material that is to be roll-bonded does not result in a turbulent but in a laminar deformation, even in thin layers. Thus, when rolling thin layers further, the closed layer is thus not destroyed until the Boudinage effect becomes important.

b) Tearing of Layers

During rolling operation, at a given pressure, soft material is deformed to a higher degree than hard material. If hard and soft materials are connected, the hard material is entrained. This can cause tearing (Boudinage effect). Thin, hard layers on a thick, soft material tear when the deformation of the soft material is above the tensile strength of the hard material. The total amount of deformation should therefore preferably not exceed the tensile strength of hard and thin layers in a composite.

9. Recrystallizing Annealing After Rolling

Advantageously, a continuous annealing system is used for the recrystallizing annealing step, when the formation of a mixed-crystal zone is to be avoided as much as possible.

With high total amounts of thickness reduction due to roll bonding and rolling, which are allowable according to the method and render the method particularly economical, it is possible for recrystallization to occur even at low temperatures such as about 150° C. to 450° C. Even such heating is understood as recrystallizing annealing within the meaning of the method according to the invention.

10. Further Deformation After Recrystallizing Annealing

The strip laminate that is made according to the invention can now undergo considerable further deformation such as, for example, by deep-drawing at an amount of deformation of more than 20%, preferably more than 45%.

11. Limitations

The method is limited in that
- a metal-strip multilayer stack that is to be roll-bonded should have a maximum thickness of about 15 mm, because it is only possible to coil and uncoil strips of approximately up to that strength; also, typically, only strips having this maximum strength are available as a starting material;
- a film that is to be roll-bonded as first metal strip should have a minimum thickness of about 40 µm, because otherwise there would be a tearing risk of the film during roll bonding;
- the layer material must be suitable for manufacture as a strip, and it must be plastically deformable. For example, this excludes chromium as a layer material;
- the connection must be possible by roll bonding;
- the formed multilayer stacks are to have a thickness that is in total close to the maximum roll gap of the used clad stand, such that the method according to the invention can be employed as efficiently as possible. Preferably, multilayer stacks are formed as being at least as thick as the available roll gap on the clad stand.

H. Achieved Advantages

The method according to the invention of making thin layers on the surface area or in a laminate made of at least two different metals includes economical and technical advantages in comparison to the prior art.

The proposed method is particularly economical:

Thick layers are connected with at least one thick metal strip. This way, the surface area that must be coated is drastically reduced. Due to the early connection step in the stages of the manufacturing process, the thick layers are reduced along with the rest without incurring additional costs, because the metal strip must be reduced in any case by rolling.

Since the first metal strip that is used for the roll bonding and that forms the layer is—compared to the final thickness thereof—relatively thick, the manufacture of thin strips, which is associated with disproportionately high costs, can be avoided. The layers do not become thin until being roll-bonded on the metal strip and the subsequent further thickness reduction together with the coated metal strip, particularly a core material.

Layer material/first metal strip made of an electrolytically made material is/are cheaper than hot-melted metallurgically manufactured strips.

Roll bonding in combination with subsequent further thickness reduction by rolling is a particularly efficient method for increasing surface area, because thickness reduction by roll bonding and further thickness reduction by rolling are coupled by a multiplication factor.

Moreover, the proposed method includes the following technical advantages:

Electrolytically made first metal strip/layer material can be made without inclusions. This is a necessary prerequisite for the manufacture of closed thin layers.

By the high level of compression of the material during roll bonding and rolling there results—contrary to the thin-film coating methods—a surface that is free of pores.

The addition of oxides and of further nonmetallic inclusions is already reduced by the electrolytically made starting material instead of hot-melted metallurgically made starting material. Due to the fact that this material is also applied as a relatively thick strip, the surface area to which surface oxides adhere is smaller in comparison to the application on a thinner material.

With roll bonding and subsequent annealing, the mixed-crystal formation extends over a smaller surface area than in the context of thin-film coating methods, because, with roll bonding, the annealing step does not occur on the product with dimensions that are close to the final dimensions. The mixed-crystal formation extends also over a smaller thickness with annealing after the rolling step, because only a recrystallization annealing step is necessary instead of a diffusion annealing step, which can be achieved in a short amount of time in a continuous annealing line.

During roll bonding as well as thickness-reduction rolling, the core material and coating undergo thickness reduction proportionately, such that starting and final thicknesses can be easily calculated.

I. Embodiment

A preferred embodiment of the invention relates to the manufacture of a nickel-clad steel strip that is processed into battery cans. Battery cans of size AA have a wall thickness of, for example, only about 200 µm with a thickness of the nickel layer of about 1.0 µm. Inclusions in the steel or in the nickel coating can therefore cause tears and holes in the material. The first metal strip and the second metal strip (meaning the nickel coating as well as the steel) must therefore be free of inclusions to an extreme degree. Battery manufacturers are subject to the following quality requirements regarding material used in the manufacture of battery cans with regard to non-metallic inclusions:

fewer than 0.2 inclusion per $m^2$
individual particles no larger than 1 µm
inclusion clusters no larger than 5 µm.

Insofar as battery cans include a nickel coating such as, for example, alkali-manganese batteries, the coating is currently applied exclusively by electrogalvanic means. This way, it is ensured that the coating per se is free of inclusions such that the base body, which is made of steel, is covered by a closed nickel layer measuring about 0.5 µm to 3.0 µm. However, the coating is brittle, has a columnar structure, contains pores and has insufficient adhesive strength for deep-drawing the cans. For regranulating and increasing the adhesive strength of the coating, the coated steel must thus undergo an annealing process, and the strip must be post-rolled to remove pores in the material. These operating steps would actually not be necessary with a coating that has adhesive strength and is free of pores. In the manufacture of battery cans from galvanically coated steel, however, these properties also serve the purpose of generating a thicker diffusion layer and providing certain surface properties. A thicker diffusion layer is not to have a negative effect on the corrosion fastness, when the iron content on the surface is less than 30 wt %.

When coating by bond rolling with hot-rolled metallurgically manufactured nickel film, the layer thickness would have to be increased to compensate for the lower degree of purity. Moreover, it would be necessary to avoid nonmetallic inclusions in the nickel strip that is to be roll-bonded. To this end, remelting of the nickel slabs may be necessary. Both effects can make bond rolling with hot-rolled metallurgically made nickel film an uneconomical undertaking.

For the nickel coating according to the invention, a first metal strip was used that comprised electrolytically obtained 75 µm films as well as connected cathode plate metals made of 99.98% nickel, rolled to 75 µm films. Strips that are electrolytically obtained as films are manufactured, for example, by Special Metals Wiggin Ltd., Hereford, UK, and Fukuda Metai Foil & Powder Co. Ltd., Kyoto, Japan.

The films made from the cathode plates are already free of pores due to the strong thickness reduction. The electrolytically obtained films contain pores; however, the pores are eliminated by the pressure that is applied during bond rolling, as well as subsequent diffusion annealing and post-rolling.

A special advantage of this method is the fact that the thickness of the coating, meaning the thickness of the first metal strips (nickel) can be selected as being different on both sides of a second metal strip/core material (steel). The side that will serve as the interior of the battery at a later time can be made with a thicker layer, and the side that will serve as the exterior side at a later time with a thinner layer.

The core material and/or the total multilayer stack is reduced by bond rolling and rolling, in the example by a total of 96%. Even with this high amount of thickness reduction, the material must be free of fringes as much as possible.

A steel that was used as a second metal strip, which forms the core of the laminate according to the invention, had the following properties:

| Element | | Value | Preferably | More preferred |
|---|---|---|---|---|
| Carbon | C | <0.08% | <0.03% | 0.0005 to 0.008% |
| Manganese | Mn | <0.60% | 10.45% | 0.015 to 0.45% |
| Phosphor | P | 50.04% | 50.02% | <0.025% |
| Sulfur | S | <0.04% | <0.02% | 0.005 to 0.02% |
| Aluminum | Al | ±0.15% | <0.15% | 0.005 to 0.06% |
| Silicon | Si | <0.1% | <0.1% | <0.04% |
| Titanium | Ti | <0.015% | <0.005% | |
| Nitrogen | N | | | <0.005% |

A smooth pass for evening out the roughness of the hot strip did not prove necessary. Maximum roughness values that result in iron making contact with the surface of the bond rolling film are not harmful because up to about 30% iron in the surface of the nickel coating does not negatively influence the resistance to alkaline-containing media.

The nickel films were roll-bonded on both sides on a deep-draw steel of the above-described compensation having 6.0 mm thickness with a thickness reduction of 60%. The roll-bonded laminate had a strength of about 2.4 mm. The composite was annealed inside a bell-type annealing furnace in order to reinforce adhesion. The annealing step generates a mixed-crystal layer of a thickness of about 1.4 µm; the layer is reduced to about 0.14 µm by the subsequently described rolling process.

The roll-bonded laminate was reduced in thickness on a six-high rolling stand by about 90% to 0.24 mm.

Due to the fact that deep-decarburized steel and superpure nickel are soft materials, no Boudinage effect occurs with the above-described amounts of deformation.

As a variant, a nickel strip having a thickness of 3.125 mm, manufactured from connected cathode plates, was bonded on one side by rolling with an amount of thickness reduction of 70% to a cobalt strip having a thickness of 0.52 mm. The cobalt strip can also be made from connected cathode plates or purchased as a rolled strip (high purity cobalt) from Ametek Specialty Metals Products, Wallingford, Conn., USA. This composite was further reduced by rolling with an amount of thickness reduction of a total of 92%.

| Work step | | Nickel | Cobalt |
|---|---|---|---|
| | Starting material | 3125 μm | 520 μm |
| Roll bonding | Thickness reduction in % 70 | 937.5 μm | 156 μm |
| Rolling | Thickness reduction in % 92 | 75 μm | 12.48 μm |

Following further thickness reduction by roll bonding on steel with a thickness reduction of 60% and rolling as composite with a thickness reduction of 90%, the cobalt layer thickness is 0.5 um. The cobalt-coated nickel has a lower transition resistance than pure nickel after having been processed into battery cans.

The expedient strip thickness for the manufacture of battery cans is between 0.1 mm and 0.765 mm with a nickel layer of <5 μm per side, the thickness of the layer constituting later the inside of the battery can being at least 0.5 μm to 2 μm.

After thickness reduction by rolling, and in preparation of the deep-drawing step, the composite is annealed in a continuous annealing line at an annealing temperature of 600° C. to 900° C. and a holding period of 30 seconds to 2 minutes. When annealing is done in a bell-type annealing furnace, the annealing temperature is adjusted to 550° C. to 710° C. The holding period is 2 to 10 hours, the preheating period is 1 hour and the cool-down period to 100° C. is 23 to 33 hours. The thickness of the mixed-crystal layer that is generated by the annealing step can be adjusted in a targeted fashion by the selection of the annealing systems, annealing temperature and annealing period.

An intermediate annealing step is not necessary for steel in the even more preferred composition, due to the low carbon content and the very soft pure nickel that is used as metallic coating. Short-term heating to an annealing temperature of 200 to 450° C. is sufficient for the recrystallization.

To improve the mechanical values, the annealed strip is post-rolled at an amount of deformation of 1 to 2%.

Deep-drawing experiments with an amount of stretching of 50% that were done with the annealed material demonstrated that the surface of the deep-drawn material still had a closed nickel layer of a minimum thickness of 1.0 μm.

Deep-drawing the material into battery cans can be done by different methods that differ in terms of how the strength of the side walls changes: with drawing thin and redraw (DTR), the thickness of the starting plate is almost unchanged; with drawing and ironing (DI), the thickness of the base plate remains almost unchanged, with side walls being stretched. When drawing and leveling battery cans, the side walls are typically reduced by about 50%, but also up to 80%. The wall thickness after deep-drawing is about 125 μm, with two-sided nickel coating of respectively 1.5 μm.

| | | Thickness | |
|---|---|---|---|
| Work step | Thickness | Base material mm | Nickel coating per side μm |
| Starting material | | 6.0 | 75 |
| Bond rolling | 60 | 2.4 | 30 |
| Rolling | 90 | 0.24 | 3.0 |
| Deep-drawing | 50 | 0.12 | 1.5 |

With the amounts of thickness reduction as indicated in the example, bond rolling and rolling result in an increase of the surface area that is 25-fold.

To reduce the transition resistance and to improve the deep-drawing properties of the strip, it is possible to embed cobalt, graphite or phosphor in the surface.

The strip has the following properties before the deep-drawing step:

| Mechanical characteristics | Unit | Value | Preferred |
|---|---|---|---|
| Tensile strength | MPa | ±480 | <450 |
| Yield strength | MPa | 151-380 | 220-380 |
| Elongation at break | % | >18 | 34 |
| Hardness | Vickers | 85-150 | 85-150 |
| Structure | | Ferritic structure with embedded cementite | |
| Grain | | Globular Equiaxed or | Globular Equiaxed or pancake |
| Grain size | ASTM | 7-12 | 9-12 |
| Delta r value | | +/−0.3 | <+/−0.2 |
| Langford value | | >0.7 | >1.2 |

I claim:

1. A method of making a metal laminate, the method comprising the steps of sequentially:
    a) laying at least one first metal strip of at least one first metal having a thickness of 40 μm to 750 μm on at least one second metal strip of a second metal different from the first metal to form a multilayer stack having a total thickness between 2 mm and 15 mm and a predetermined starting surface area;
    b) bonding together the first and second strips of the multilayer stack by rolling; and
    c) forming a finished laminate by reducing a thickness of the bonded-together first and second strips by rolling in at least one pass such that the starting surface area of the bonded-together first and second strips is increased by a factor of at least 25 and the one first metal strip has a thickness of 0.5 to 10 μm.

2. The method defined in claim 1, wherein the multilayer stack has a total thickness between 5 and 7 mm.

3. The method defined in claim 1, further comprising the step of:
    diffusion annealing the stack prior to step c) to produce between the first and second strip a diffusion layer that is also reduced in thickness during thickness reduction.

4. The method defined in claim 1, wherein the stack is comprised of only the first strip and the second strip.

5. The method defined in claim 4, wherein prior to step c) the thickness of the one second metal strip is 5 to 10 mm and the thickness of a first metal strip is 0.8-15% of the thickness of the individual singular second metal strip.

6. The method defined in claim 1, wherein the first metal strip is a finished laminate made by the steps a), b), and c) of claim 1.

7. The method defined in claim 1, wherein the first metal strip is itself a laminate.

8. The method defined in claim 7, wherein the first metal strip that is a laminate is made by electrolytic deposition from cathodes and rolled before step a).

9. The method defined in claim 1, further comprising, prior to step a), the step of:
   treating at least one of the strips by pickling in acid or skin-pass rolling prior.

10. The method defined in claim 1, further comprising the step after step c) of
   annealing the stack in a recrystallizing manner in a continuous annealing line so as to develop between the strips a mixed-crystal diffusion layer having less than 50% of the thickness of the first metal strip has after step c).

11. The method defined in claim 1, wherein the first strip is of nickel and the second strip is of steel and has a carbon content of <0.08 wt. %.

12. The use of the finished laminate made by the method of claim 1 as a starting material for the manufacture of wound tubes according to the Bundy method.

13. The use of the finished laminate made by the method of claim 1 as a starting material for the manufacture of wound tubes according to the Bundy method.

14. The use of the finished lacinate made by the method of claim 1 for the manufacture of wound tubing.

* * * * *